Nov. 27, 1945.  C. JOHNSON  2,389,731
MACHINE TOOL CONTROL
Filed Nov. 30, 1944

INVENTOR.
CLARENCE JOHNSON
BY Raymond D. Junkins
ATTORNEY

Patented Nov. 27, 1945

2,389,731

UNITED STATES PATENT OFFICE 2,389,731

MACHINE TOOL CONTROL

Clarence Johnson, South Euclid, Ohio, assignor to Bailey Meter Company, a corporation of Delaware Application November 30, 1944, Serial No. 565,868

6 Claims. (Cl. 82—14)

This invention relates to duplicators or contour control for controlling the operation of a material forming machine so that a work piece is formed to a contour or configuration determined by a template, pattern or cam.

In accordance with my invention the template or cam for producing the desired configuration on the work piece is scanned by a tracer regulating a jet of fluid from a nozzle or the discharge of fluid to the atmosphere from a valve. Variations in the shape of the template cause corresponding changes in the rate of fluid discharged from the nozzle or valve, which variations are then used to control the relative positioning of the tool and work piece.

Further, in accordance with my invention, the changes in fluid pressure control the relative positioning of the tool and work piece through a hydraulic relay and servomotor to the end that ample power is available for accurately positioning the tool relative to the work piece, or vice versa.

Obviously a duplicator or contour control of the type forming the subject matter of my invention may be employed with material forming machines or machine tools of various types, such as milling machines, lathes, slotters, planers, die sinking machines, and other machines in which the relative speed between the tool and work may be suitably controlled. By way of example I illustrate and will describe my invention as applied to metal working vertical boring mills. Further applications and modifications of my invention will be readily apparent.

In the past certain types of jobs have had to be handled on vertical milling machines at relatively slow speed. Many of these jobs I can now accomplish with decided advantage in a vertical boring mill embodying my invention. Preferably I utilize a single point cutting tool which remains in a fixed or stationary position and relative to which I rotate and otherwise move the work piece. The use of a single point cutting tool provides numerous advantages, some of which will be mentioned, while others will be apparent.

Throughout the specification and in the claims to follow I have indicated that the workpiece is formed to correspond to the profile or shape of a master template or cam. By such language I do not intend to imply that the workpiece is brought to the exact shape of the master, but, as will be evident to those familiar with the art, the master will be formed so that the ultimate shape of the work piece produced is that desired, and that therefore the shape of the work piece may differ from that of the master by the amount of angularity, etc., in the mechanism. Furthermore, I use the terms contour, profile, shape and the like in a broad sense, and not with any limiting distinction between the profile of a two-dimensional silhouette or the surface configuration of a body for example. In general, the pattern dictates the desired shape of the workpiece. I use profile and contour interchangeably. The pattern has the desired shape, although it is not necessarily the exact shape.

By strict definition one might be led to believe that "profile" is only the edge shape of a two-dimensional silhouette for example. Usually it is spoken of as the edge shape of a thin plate template, although such a template is a three-dimensional object. Usually "contour" is the surface configuration, or at least of a portion of the surface of a three-dimensional object. Applicant intends to make clear that in speaking of profile or contour he means the forming of a workpiece to a shape as dictated by that of a template or pattern, and without any specific or limiting meaning being given to the terms "profile" and "contour."

The pattern or template has a shape corresponding to the desired path of movement of the tool or of the work to produce the desired finished workpiece. By "corresponding" is meant that not only is the pattern or template the same shape as the desired workpiece either in greater or smaller proportion thereto; but also the pattern or template may be in any desired distorted shape to compensate for characteristics of the machine. While the pattern or template must correspond to the desired workpiece, it is not necessarily identical in contour, and therefore the term "correspond" implies that the pattern or template is purposely designed to result in the desired contour of the workpiece to be produced.

Figure 1:
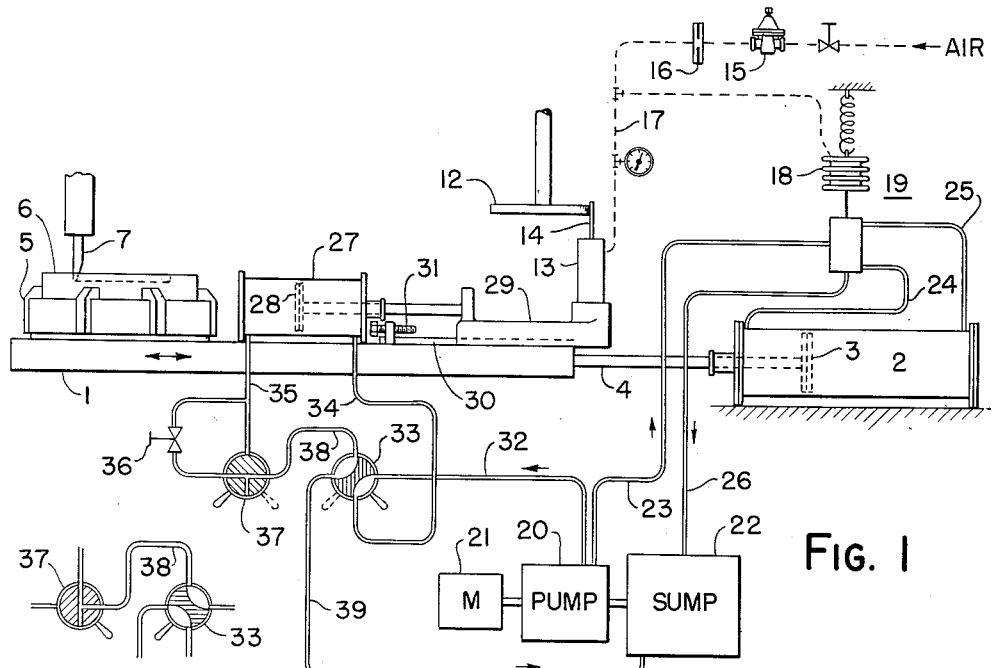
Fig. 1 is a somewhat diagrammatic side elevation of a portion of a vertical boring mill to which my invention has been applied.

Referring now to Fig. 1, I show my invention applied to a vertical boring mill having a table 1 positionable in either direction along a single path on suitable ways (not shown). For positioning the table 1 I provide a hydraulic servomotor comprising a cylinder 2 and piston 3. The cylinder 2 is rigidly mounted, while the piston 3 is arranged to position the table 1 through the agency of a piston rod 4.

Mounted on the carriage 1 is a rotatable work holder 5 in which is fastened a workpiece 6. The holder 5 is normally rotated at a uniform speed in common manner. The workpiece 6 (through movement of the table 1) is positioned in one direction or the other relative to the fixed cutting tool 7. As so far described, the cutting tool 7 would cut a circular groove or depression in the upper surface of the workpiece 6 and the diameter of such a cut would be determined by the right or left movement of the table 1 relative to the cutting tool 7. A particular feature of the present invention is for cutting spiral cuts, or in machining irregular shaped gasket surfaces and the like.

Figures 5, 6:
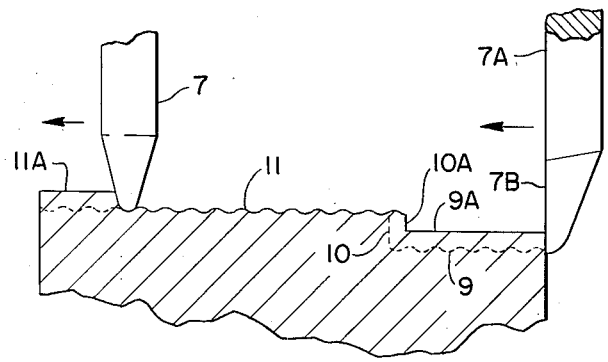
Fig. 5 is an enlarged section taken through a portion of Fig. 4 along the line 5—5 in the direction of the arrows.
Fig. 6 is an enlarged section of a portion of Fig. 5 showing a machining operation.
Figures 3, 4:
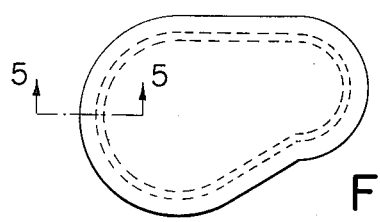
Figs. 3 and 4 are examples of contour surfaces.

In Figs. 3 and 4 I illustrate some of the irregular gasket shapes to which I refer. For example, Fig. 3 represents an elliptical gasket surface of a hand hole plate. Fig. 4 illustrates the irregular gasket surface between the body and the head of a pressure chamber. Fig. 5 illustrating a portion of a section through the mating gasket surfaces of Fig. 4. It is to this latter problem in particular that I will direct my description.

Assuming now that the workpiece 6 is the lower portion of the assembly of Fig. 5, to have a gasket surface prepared thereon of the general outline indicated in Fig. 4. Preferably such a gasket surface is at two elevations or of the tongue and groove type wherein the gasket material 8 is confined on three sides against the pressure acting on the fourth side. Furthermore, it is frequently desired to have surfaces finished to what is commonly termed a "phonograph finish" comprising a surface of concentric or spiral groove to more readily grip a gasket against relatively high pressure.

Assume that the workpiece 6 of Fig. 1 is the lower portion 6 of the assembly in Fig. 5. The machined surfaces 9, 10, 11 (Fig. 5) are to be produced on the workpiece 6 (Fig. 1). Preferably these surfaces 9 and 11 are to be of the phonograph finish type, whereas the surface 10 is to be a smooth finished surface (Fig. 6). The original casting or rough workpiece may have an unmachined surface 9A, 10A and 11A.

Referring now to Fig. 1, it is apparent that if, with the workpiece 6 rotating, the tool 7 is fed downwardly it will cut a circular groove in the top surface of the workpiece 6. To have the cut follow an outline, such as diagrammatically indicated at Fig. 4, it is necessary to simultaneously move the table and work piece 6, to the right or left relative to the stationary tool 7. This is accomplished through the agency of the servomotor 2, 3 by means of a combination pneumatic-hydraulic control which I will now describe.

At 12 I indicate a template or pattern having a configuration conforming to the general outline of Fig. 4 to be reproduced as a gasket surface on the workpiece 6. As previously mentioned the contour or shape of the pattern 12 does not necessarily match exactly the shape to be reproduced, but is so formed as to result in the proper shaping of the workpiece 6. Preferably the pattern 12 is fixed with reference to the tool 7 and is rotated at a speed the same and in synchonism with the rotating workpiece 6. Inasmuch as this is accomplished through the ordinary gearing of the boring mill it is not necessary to explain in detail.

I provide a tracer assembly 13 having a tracer arm 14 adapted to scan the pattern 12. Such a tracer assembly may be of the type disclosed in my copending application, Serial No. 524,707. Air under pressure from any convenient source is passed through a pressure regulator 15 and an orifice 16 to a pipe 17 connected with the tracer assembly 13. As the air discharges from the tracer 13 to the atmosphere the pressure in the pipe 17 between the orifice 16 and the tracer assembly 13 will vary and such controlled air pressure representative of changes in contour of the pattern 12 is effective upon a bellows 18 of a pilot valve assembly 19. The pilot valve assembly 19 may be of the type disclosed in my copending application above referred to.

I show an oil pump 20 driven by a motor 21 and drawing its supply of oil from a sump 22. Oil under pressure is supplied the pilot valve 19 by the pump 20 through a pipe 23. From the pilot valve 19 oil is supplied to one end or the other of the servo-motor 2, 3 through the pipes 24 or 25. Drainage from the pilot 19 is returned to the sump 22 through a pipe 26.

If the configuration of the pattern 12 is a circle then there will be a uniform pressure contact or deflection of the tracer arm 14 against the periphery of the template 12 determining a uniform bleed of air to the atmosphere from the pipe 17. Under this condition a constant air pressure, of some predetermined value, will exist within the bellows 18 and the movable element of the relay valve 19 will be in a position to lock the pipes 24, 25 against admission or discharge of oil from opposite sides of the piston 3 in the cylinder 2. Thus the piston 3 would remain stationary and the work 6 would not move toward the right or toward the left on the drawing relative to the cutting tool 7. The cutting tool 7 would thus describe a circle on the rotating workpiece 6. If, however, the periphery of the template or pattern 12 is other than a circle, then as it rotates past the tracer arm 14 the said tracer arm will be deflected more or less with a resultant increase or decrease in the bleed to atmosphere of air from the pipe 17. The result will be an inflow or outflow of oil at opposite sides of the piston 3 with a movement of the table 1 and work piece 6 to the right or to the left relative to the cutting tool 7. Such movement of the table 1, carrying the tracer assembly 13, will follow up the deflection of the tracer arm 14 and tend to stop further movement of the piston 3. Thus a continuous follow-up is provided through actual movement of the table 1 in proper direction.

Under the conditions so far explained, the tool 7 would follow a path on the work 6 conforming in general to the configuration of Fig. 4, but after one complete revolution of the workpiece 6 the tool 7 would continue in the same path without additional cutting of material from the surface 9A or the surface 11A. It is, however, necessary to have the tool 7 cut different paths for each revolution of the workpiece 6, or otherwise there would be no progressive machining across the workpiece 6 to form the desired surfaces 9, 10, 11. Thus upon each revolution of the workpiece 6 the tool must describe a new path parallel to the first cutting path, or else preferably the entire cut must be a distorted spiral in nature.

If the cutting tool 7 is properly shaped and the transverse progressive movement of the workpiece 6 relative to the tool 7 is properly adjusted, the machined surface 11 will be substantially smooth. In many instances, however, it is desirable to have the surfaces 9, 11 (Fig. 6) a phonograph finish for better gripping of the gasket material, and this may be accomplished through proper grinding of the tool shape and proper lead of the spiral of its travel. Thus the magnitude of the hills and valleys of the surface 11 and spacing of the cycle may be predetermined. I will now explain that feature of my invention which produces a progressive movement of the table 1 and workpiece 6 transversely of the tool 7 while the workpiece is rotating. This to accomplish the spiral or phonograph cutting to progress the tool across the surface to be machined as the work 6 is rotated.

Mounted on and carried by the table 1 I provide a servo-motor having a cylinder 27 and piston 28 for positioning a slide 29 along ways 30 relative to an adjustable stop 31. The tracer assembly 13 is mounted on and positioned by the slide 29 on the table 1.

Oil under pressure is supplied from the pump 20 through a pipe 32, a valve 33, and a pipe 34 to the right-hand end of the cylinder 27. Oil from the left-hand end of the cylinder 27 is bled through a pipe 35, a throttle valve 36, a control valve 37, the pipe 38, valve 33 and a pipe 39 to the sump 22. Depending upon the opening of the hand regulated valve 36 the piston 28 will move continuously from the right-hand end of the cylinder 27 toward the left-hand end. The speed of such movement depending upon the throttling of the bleed valve 36.

As the piston 28 slowly moves toward the left on the drawing, the tracer arm 14 contacting the pattern 12 is continuously and uniformly deflected toward the right. This produces a continuous predetermined pressure condition within the pipe 17 and bellows 18 resulting in a uniform continuous movement of the piston 3 toward the right, thus traveling the table 1 and workpiece 6 toward the right. Such table travel acts as a follow-up on the tracer 13 in an attempt to restore the pressure conditions within the bellows 18 and stop movement of the piston 3. At the same time this continuous uniform movement of the work 6 toward the right means that as the work 6 revolves the stationary tool 7 would describe a spiral cut upon the surface 11 or 9 if the configuration of the pattern 12 is a circle. With the pattern 12 shaped to conform to the desired configuration of Fig. 4, for example, the pattern shape additionally influences the tracer arm 14 in positioning the table 1 relative to the tool 7.

The resulting action is that the surfaces 9A and 11A will be machined to the general configuration of Fig. 4 in a phonograph finish, as indicated at 9 and 11, and such continued movement of the table 1 toward the right will continue until the left-hand end of the slide 29 engages the stop 31 whereafter continued rotation of the work 6 results in the tool 7 repeating its last cutting path.

Hand adjustment of the throttle valve 36 bleeding oil from the left-hand end of the cylinder 27 determines the speed of travel of the piston 28 toward the left in the cylinder 27, and thus the pitch or lead of the grooves on a surface such as 11.

Figure 2:
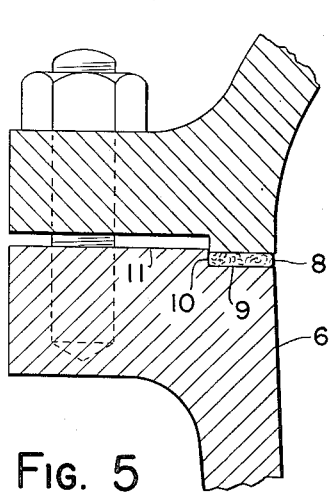
Fig. 2 is a transfer valve arrangement of Fig. 1.

In Fig. 2 I show the alternate position of the valves 33, 37 for rapid return of the piston 28 toward the right in the cylinder 27. In the position shown in Fig. 2 the throttle valve 36 is ineffective. Oil from the pump 20 passes directly through the pipe 32, the valve 33, the pipe 38, the valve 37, and the pipe 35 to the left-hand end of the cylinder 27. Oil from the right-hand end of the cylinder 27 bleeds through the pipe 34, the valve 33 and the pipe 39 to the sump 22.

Suitable and ordinary valving means may be provided in connection with the servo-motor 2, 3 for rapid traverse of the piston 3 in either direction.

In Fig. 6 I indicate the possibility of simultaneously cutting with a plurality of single point tools 7, 7A. Thus to produce the machined surfaces 9, 10, 11 from the cast or rough initial surfaces 9A, 10A, 11A I provide properly spaced single point tools 7, 7A. In Fig. 6 the tools 7, 7A are relatively cutting in the direction of the arrows through general movement of the table 1 toward the right. The tool 7 has produced a portion of the surface 11 shown in solid line and the tool 7A is just ready to begin producing the finished surface 9 shown in dotted line. The tool 7A is shaped to have a round nosed cutting edge and a finishing edge 7B; the latter for finishing the surface 10A into the final surface 10. The spacing of the tools 7, 7A is such that the tool 7 will run off from the finished surface 11 before the cutting edge 7B reaches and finishes the shoulder surface 10. The adjustment 31 is initially so set as to stop travel of the slide 29 along the ways 30 just as the cutting surface 7B reaches the desired finish line 10. Thereafter continued rotation of the workpiece 6 will mean that the tool 7 is cutting air at the left beyond the finished surface 11 and the tool 7A repeats its path along the finished surface 10, 9.

It will be apparent that while I have illustrated and described my invention in connection with a vertical boring mill, it is not limited thereto, and that there are many other types of material shaping or forming machines to which the invention may be adapted. Further features and advantages, beyond those here described, will be apparent to those skilled in the art.

What I claim as new and desire to secure by Letters Patent of the United States is:

1. In a vertical boring mill in combination, a stationary single point cutting tool, a work piece rotatable relative to the cutting tool, means for laterally moving the work piece relative to the cutting tool, a pattern having the desired shape of the work piece and rotated in synchronism with the work piece, a tracer laterally positioned with the work piece and scanning the pattern, said tracer controlling said means, and other means progressively laterally positioning the tracer relative to the pattern.

2. The combination of claim 1 wherein said other means comprises a hydraulically actuated slide positionable along the lateral path of movement of the work piece.

3. The combination of claim 1 wherein said other means includes a hydraulic servo-motor, and variable speed control means for the servo-motor providing a progressive uniform lateral movement of the tracer relative to the rotating pattern.

4. In a material forming machine in combination, a stationary single point cutting tool, a work piece and work holder rotatable relative to the cutting tool, a rotatable pattern having the desired shape of the work piece, means for rotating the work piece and pattern in synchronism, a tracer adapted to scan the rotating pattern, hydraulic means arranged to position the work piece and tracer laterally in either direction along a single path relative the tool and pattern respectively, the tracer controlling the said hydraulic means, other hydraulic power means laterally positioned with said work piece and arranged to continuously urge the tracer in one direction laterally relative the pattern irrespective of the positioning of the first hydraulic means, and means regulating the extent of such urging.

5. The combination of claim 4 wherein said last means includes a valving control of fluid discharge from said other hydraulic power means.

6. In a material forming machine in combination, a stationary cutting tool, a work piece rotatable relative the cutting tool, a rotatable pattern having the desired shape to which the work piece is to be formed, means for rotating the work piece and pattern in synchronism, a tracer adapted to scan the rotating pattern, a servomotor under the control of said tracer for laterally positioning the work piece relative the tool and comprising a follow-up on the tracer relative the pattern, whereby in operation the cutting tool will describe a repetitive path on the work piece as dictated by the shape of the pattern, and other means continuously urging the tracer in one direction relative the pattern whereby the cutting path will be progressively laterally moved on the work piece.

CLARENCE JOHNSON.